United States Patent

[11] 3,542,289

| [72] | Inventors | William K. Ojala<br>Dearborn Heights, Michigan;<br>Michael L. Urich, Rochester, Michigan |
|---|---|---|
| [21] | Appl. No. | 762,003 |
| [22] | Filed | Sept. 24, 1968 |
| [45] | Patented | Nov. 24, 1970 |
| [73] | Assignee | Ford Motor Company<br>Dearborn, Michigan<br>a corporation of Delaware |

[54] SNAP ACTION THERMALLY RESPONSIVE VALVE
1 Claim, 1 Drawing Fig.

[52] U.S. Cl. .................................................. 236/48,
236/92, 236/101, 137/625.66
[51] Int. Cl. .......................................................... G05d 23/10,
F16k 31/56, F16k 11/02
[50] Field of Search............................................ 137/468,
625.66, 625.5, 340; 251/65, 161, 75; 236/48, 92, 101

[56] References Cited
UNITED STATES PATENTS

| 2,742,927 | 4/1956 | Frumet................... | 137/468 |
| 2,747,832 | 5/1956 | Vischer................... | 251/161 |
| 2,991,805 | 7/1961 | Page........................ | 251/65X |
| 2,996,071 | 8/1961 | Takaoka.................. | 251/65X |
| 3,225,753 | 12/1965 | Bintz....................... | 251/65X |
| 3,424,199 | 1/1969 | Breitholtz et al. ....... | 251/65X |

*Primary Examiner*—Henry T. Klinksiek
*Attorney*—John R. Faulkner and Robert E. Mc Collum

ABSTRACT: A two position valve alternately supplies vacuum to or bleeds vacuum from a line as a function of the level of a trigger vacuum and the restraining force of a magnetic seat for the valve, the valve movement being further controlled by a thermally responsive, overcenter-type spring.

Patented Nov. 24, 1970     3,542,289
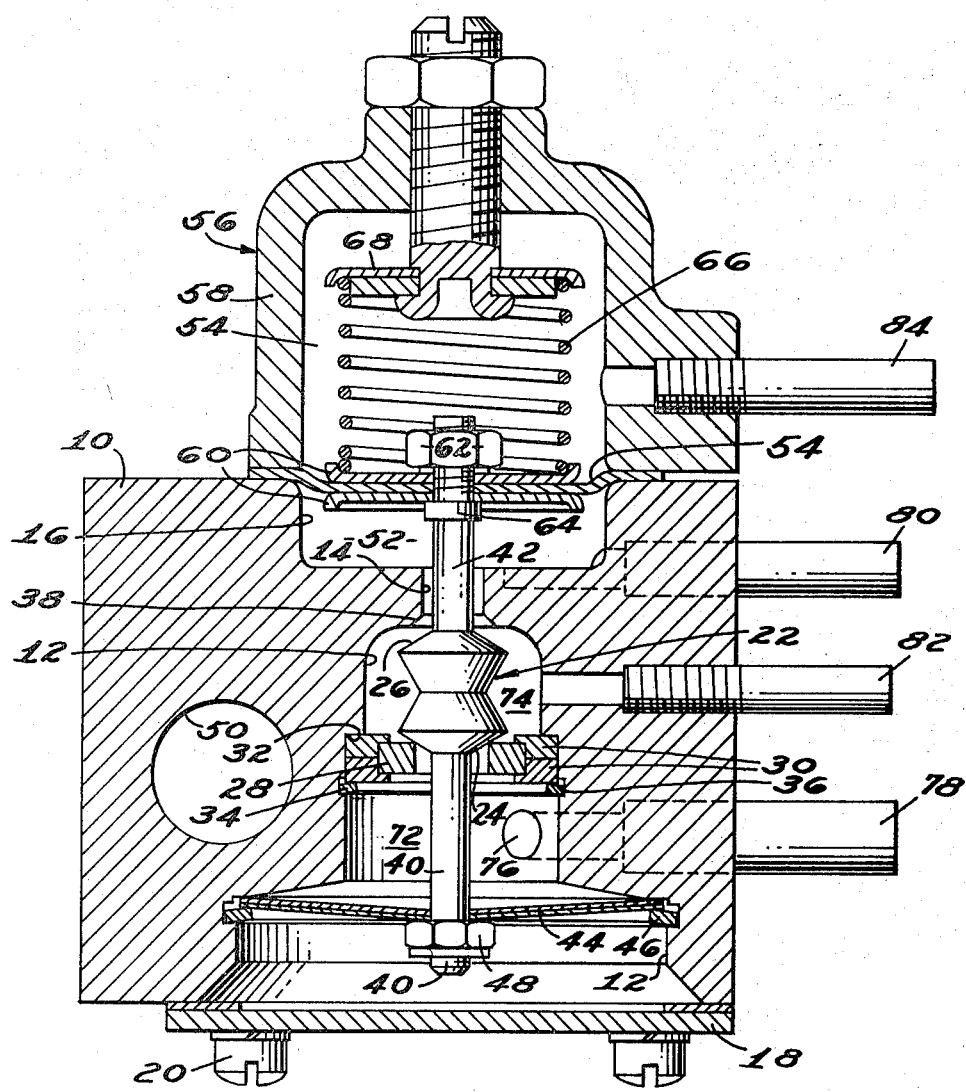
WILLIAM K. OJALA
MICHAEL L. URICH
     INVENTORS
BY
  John R. Faulkner
  Robert E. McCollum
     ATTORNEYS

SNAP ACTION THERMALLY RESPONSIVE VALVE

This invention relates, in general to a valve construction. More particularly, it relates to a snap action type valve controlling the flow of fluid alternately to or from a port via a pair of ports.

One of the objects of the invention is to provide a fluid flow control valve alternately seating against a pair of ports and including a temperature responsive spring element that will maintain the valve in one position regardless of other forces acting on the valve as long as the temperature remains below a predetermined level.

A still further object of the invention is to provide a valve construction in which one of the valve seats incorporates magnetic means therein to provide a restraining force on the valve that varies in strength with the distance of movement of the valve away from the seat so as to always provide a snap action movement to the valve.

Another object of the invention is to provide a fluid flow control valve construction consisting of a reciprocable valve movable in passage means interconnecting a pair of chambers; the valve being movable against one seat to connect one of the chambers to the passage means as a function of the force of a vacuum motor connected to the valve; the other of the seats containing magnetic means to provide a force restraining the movement of the valve away from the seat so that when finally moved it does so with a snap action; the valve construction further including a thermally sensitive bimetallic s ring element abuttable against the valve in one overcenter position of the spring element to override the vacuum motor and maintain the valve in one position until a desired temperature level is obtained at which point the thermally sensitive bimetallic element permits a normal operating action of the valve.

Other objects, features and advantages of the invention will become more apparent upon reference to the succeeding detailed description thereof, and to the drawing illustrating a preferred embodiment thereof, in which the figure shows a cross-sectional view of a valve assembly.

A valve body 10 has a stepped diameter bore 12 at one end interconnected by a narrow passage 14 to an enlarged portion 16. The open end of bore 12 is closed by cover plate 18 secured to the valve body by any suitable means, such as, for example, screw means 20.

A valve member 22 is slidably movable within bores 12 and 16 and passage 14, and is suitably formed to provide conical valve seat surfaces 24 and 26 at opposite end portions. The face 24 cooperates with the knife edge of a magnetic ring 28 held within bore 12 by a pair of annular retainers 30, as shown. The retainers are axially located against a valve body shoulder 32 by a snap ring 34 engageable in a recess 36. The valve opposite end face 26 cooperates with a matingly shaped conical seat portion 38 of passage 14, for a purpose to be described.

Valve 22 is formed with axially extending stems 40 and 42. Slidably mounted over stem portion 40 is an overcenter type, bimetallic, thermally sensitive spring element 44. The latter is held in place at its outer periphery against the valve body by a snap ring 46, and at its inner end, in the position shown abuts against a nut 48 threaded on stem 40.

The valve body 10 is provided with a passage 50 adapted to contain water or gas or other heat conducting material varying in temperature so as to vary the temperature of the valve body and the thermally sensitive element 44. Upon the attainment of a chosen temperature level, the expansion of one of the bimetallic portions of member 44 at a faster rate than the other causes element 44 to move upwardly on stem 40 with a snap action to move away from nut 48. Thus, the spring has an overcenter motion in a know manner. As will appear later, when element 44 moves away from nut 48, it permits independent operation of valve 22 in a normal manner.

The valve opposite stem portion 42 projects into a chamber 52 formed between bore 16 and an annular flexible diaphragm 54. The latter is part of a vacuum motor 56, and is mounted between a hollow cup-shaped housing 58 and valve body 10, as shown, forming a chamber 54. The diaphragm is fixedly secured to a pair of annular retainer plates 60 secured on stem 42 between a nut 62 and a boss 64. The diaphragm is biased downwardly by a spring 66 seatable against a retainer 68 adjustably mounted on vacuum motor housing 58.

As described above, the construction defines spaced fluid chambers 72 and 52 interconnected by annular passage means 74. In this particular instance, chamber 72 is adapted to be connected by a port 76 to a line 78 connected to the intake manifold of an internal combustion engine so as to be subject to the varying vacuum therein. Opposite chamber 52, on the other hand, is connected by a tube 80 to the atmosphere or ambient pressure so as to vent chamber 52. Interconnecting passage means 74 is connected by a tube 82 to, in this case, a vacuum motor assembly, not shown, although it could be any other suitable device that must be actuated. Vacuum motor chamber 54 is connected by a tube 84 to a vacuum signal force, which, in this particular instance, is suitable to trigger action of the vacuum motor, but is unsuitable as a modulating control signal. On the other hand, the intake manifold vacuum in line 78 is a good modulating control signal.

In operation, assume initially that the temperature of he fluid or gas in passage 50 is lower than the critical value, and, that at this level, it is desired that no vacuum in line 78 communicate with the vacuum motor through line 82. Accordingly, element 44 will be positioned overcenter to the position shown forceably moving valve 22 to the position shown against magnetic seat 28. This occurs regardless of the level of the signal vacuum in line 84 acting on diaphragm 54. Therefore, chamber 52 being vented through tube 80 will vent passage means 74 and the vacuum motor line 82. So long as the temperature in passage 50 remains below the desired level, valve 22 will remain in the position shown.

When the temperature in passage 50 reaches the critical level, faster expansion of one of the two bimetallic elements of spring element 44 than the other will cause a rapid snap action slide of element 44 upwardly on stem 40 to the over center position disengaging the spring element from nut 48. Accordingly, valve 22 will now be free from the force of the spring element 44 and be capable of operating in a normal manner; that is, be controlled by the action of vacuum motor 56.

Subsequently, therefore, when the vacuum in line 84 is sufficient to overcome the force of spring 66 and the magnetic retaining force of magnetic ring 28, diaphragm 58 will move upwardly rapidly. This moves valve 22 off seat 28 with a rapid action to a position against the alternate seat 38, blocking passage 14. The valve will have a snap action due to the restraining force of the magnetic ring 28 decaying rapidly with movement of the valve away from the seat. With the valve in the alternate position, vacuum motor line 82 will be connected to vacuum line 78, bleed line 80 being blocked at this time. Valve 22 will remain on this position until the intake vacuum signal in line 84 decays to a point where the force of spring 66 again is sufficient to seat the valve on magnetic ring 28. Once again, this will occur rapidly as the force of the magnetic ring will increase rapidly as the valve approaches the seat.

The above normal reciprocating action of valve 22 will occur as a function of the changes in the signal vacuum in line 84 so long as the temperature in passage 50 remains above the predetermined level chosen. When the temperature decreases to a point causing a snap action of spring element 44 downwardly to abut nut 48, then valve 22 will be seated against magnetic ring 28 regardless of the trigger vacuum signal in line 84.

From the foregoing, therefore, it will be seen that the invention provides a snap action valve alternately seatable either to supply fluid under pressure to a control line or bleed the fluid pressure therefrom as a function of the operation of a servo motor, or alternatively, as a function of the changes in operating temperature.

We claim:

1. A snap action valve device comprising, in combination, a valve body having a bore therein defining a pair of spaced fluid chambers interconnected by fluid passage means, a valve reciprocably mounted within said passage means and having a pair of oppositely facing conical valve portions, said valve body having means forming a pair of valve seats at opposite ends of said passage means for cooperation therewith of said valve portions to alternatively seal communication between the respective chambers and said passage upon seating of said valve portions, conduit means connecting a source of vacuum to one of said chambers, a control line connected to said passage means, a vent line connected to the other of said chambers, the alternate seating of said valve portions connecting said control line alternately to said vacuum or said vent line one of said valve seats comprising magnetic ring means having a restraining force on said valve when seated against said ring means that varies in strength as a function of the distance of movement of said valve away from one seat, a vacuum controlled motor secured to said valve for moving said valve, said motor including a flexible diaphragm connected to said valve and dividing said motor into a vacuum chamber connected to said vent line, spring means biasing said diaphragm and valve towards said one seat, a second source of varying vacuum connected to said vacuum chamber for moving said valve from said one seat to the other with a snap action upon attainment of a predetermined vacuum level therein, thermally responsive override means comprising an overcenter snap action spring means slidingly mounted with respect to said valve abutting said valve in one overcenter position and being operatively disengaged from said valve in the other overcenter position, said spring means moving from one position to the other with a snap action in response to predetermined temperature changes thereof, and passage means in said valve body adjacent said spring means containing fluid varying in temperature in response to changes in ambient temperature whereby said override means is rendered operative upon the attainment of a predetermined fluid temperature to move said valve against said magnetic ring means regardless of the level of vacuum in said vacuum chamber.